(12) United States Patent
Iwaguchi et al.

(10) Patent No.: US 7,021,545 B2
(45) Date of Patent: Apr. 4, 2006

(54) BAR-CODE READER, METHOD OF READING A BAR CODE AND COMPUTER PRODUCT

(75) Inventors: Isao Iwaguchi, Inagi (JP); Hideo Miyazawa, Inagi (JP); Mitsuo Watanabe, Inagi (JP); Kozo Yamazaki, Inagi (JP); Masanori Ohkawa, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 37 days.

(21) Appl. No.: 10/763,338

(22) Filed: Jan. 26, 2004

(65) Prior Publication Data

US 2004/0164161 A1    Aug. 26, 2004

(30) Foreign Application Priority Data

Feb. 21, 2003  (JP)  ............................. 2003-045082

(51) Int. Cl.
*G06K 7/10*  (2006.01)

(52) U.S. Cl. ........................... 235/462.16; 235/462.11; 235/462.19; 235/462.02; 235/462.18

(58) Field of Classification Search .......... 235/462.16, 235/462.11, 462.19, 462.02, 462.18
See application file for complete search history.

(56) References Cited

U.S. PATENT DOCUMENTS

| 5,965,864 | A | 10/1999 | Iwaguchi et al. |
| 6,247,646 | B1 | 6/2001 | Iwaguchi et al. |
| 2001/0015378 | A1* | 8/2001 | Watanabe et al. ...... 235/462.19 |
| 2002/0020747 | A1* | 2/2002 | Wakamiya et al. .... 235/462.11 |

FOREIGN PATENT DOCUMENTS

| EP | 0 667 589 A | 8/1995 |
| JP | 55-143682 | 11/1980 |
| JP | 2001-19271 | 1/2001 |
| JP | 2002-560079 | 1/2002 |

* cited by examiner

*Primary Examiner*—Jared J. Fureman
*Assistant Examiner*—Allyson N Trail
(74) *Attorney, Agent, or Firm*—Armstrong, Kratz, Quintos, Hanson & Brooks, LLP

(57) ABSTRACT

In an optical bar-code reader, an optical scanner optically scans a bar code to obtain optical power of light reflected from white bars and black bars of the bar code, a differentiation unit calculates a differential of the optical power to obtain a differential waveform, a dividing unit divides the differential waveform into a positive waveform and a negative waveform, a bar-code correcting unit calculates correct widths of black bars in the bar code from the positive waveform and the negative waveform to create corrected bar-code data, and a converter converts the corrected bar-code data into character data that is an array of numerals and alphabets.

18 Claims, 12 Drawing Sheets

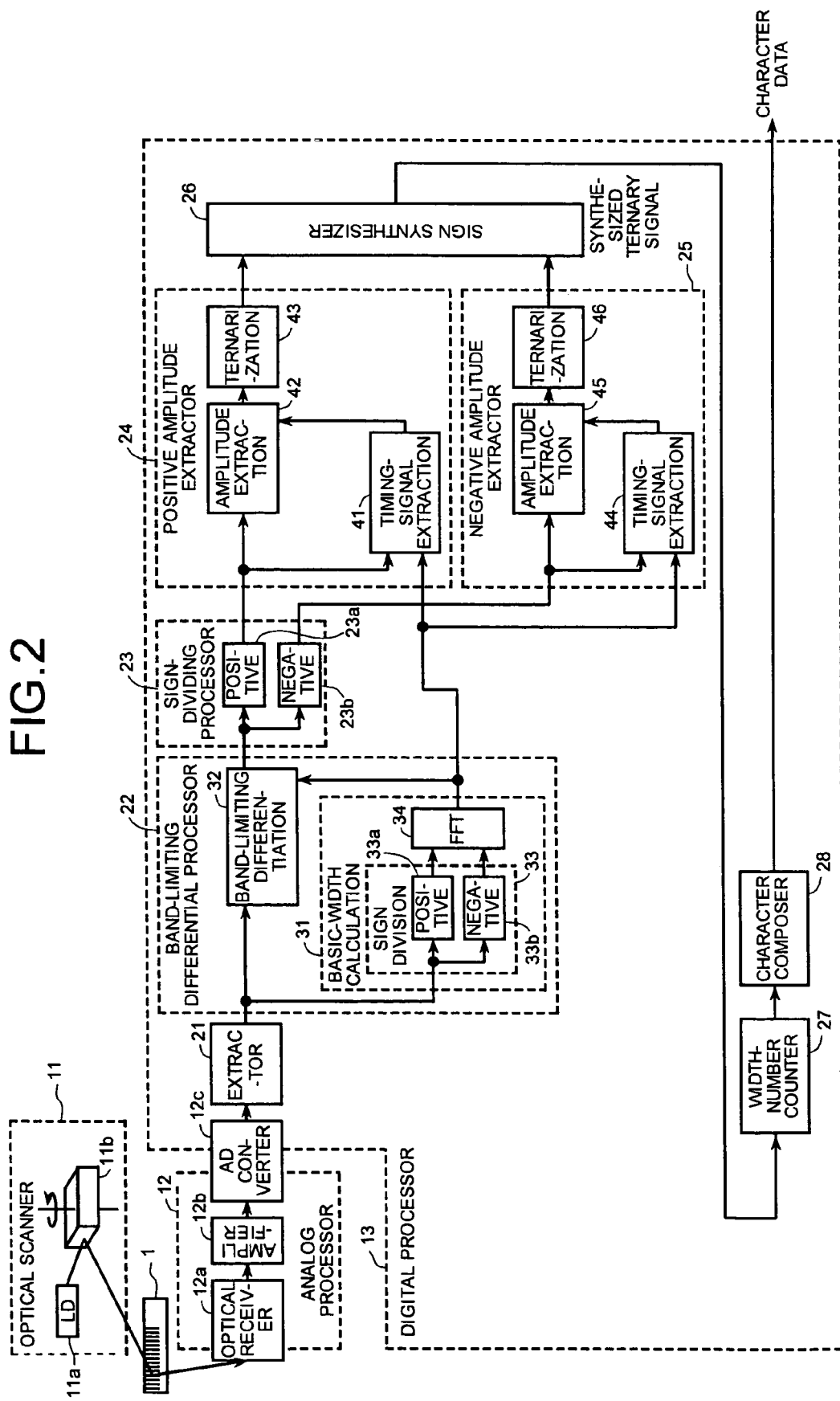

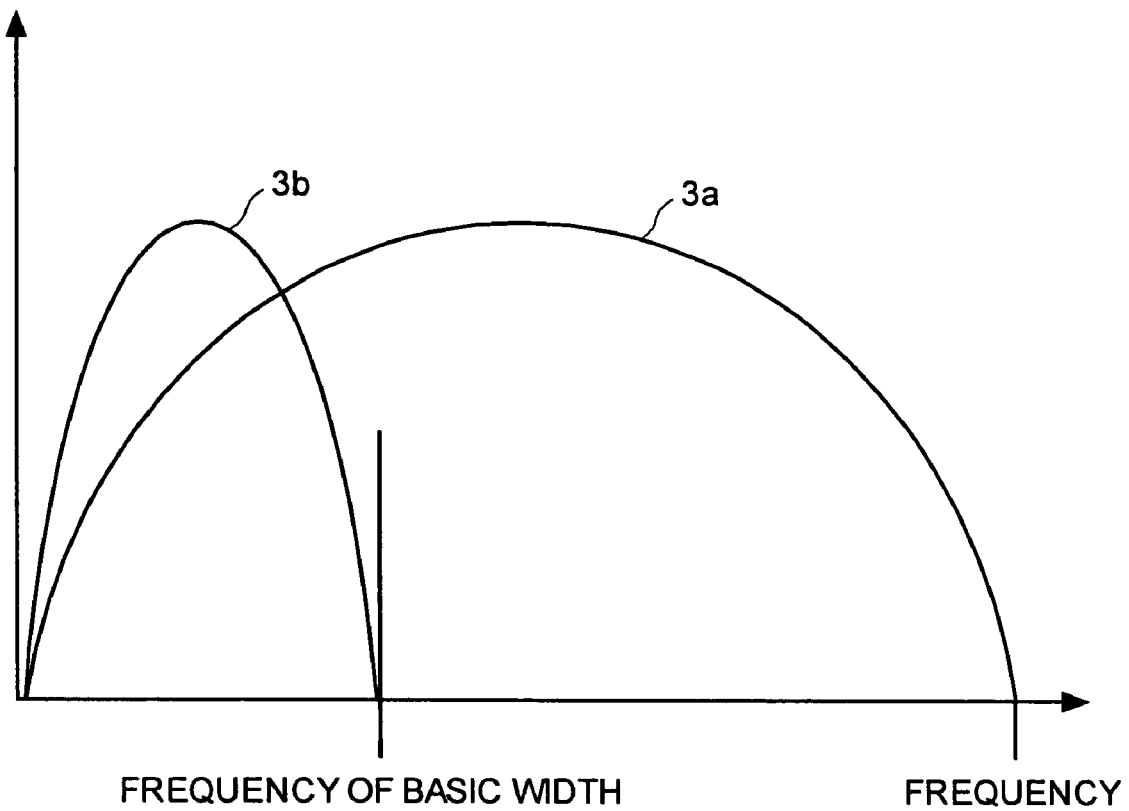

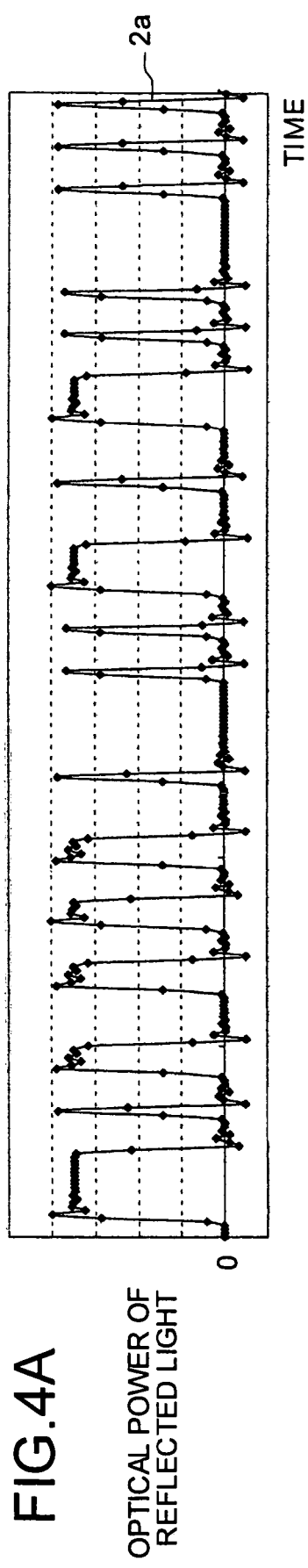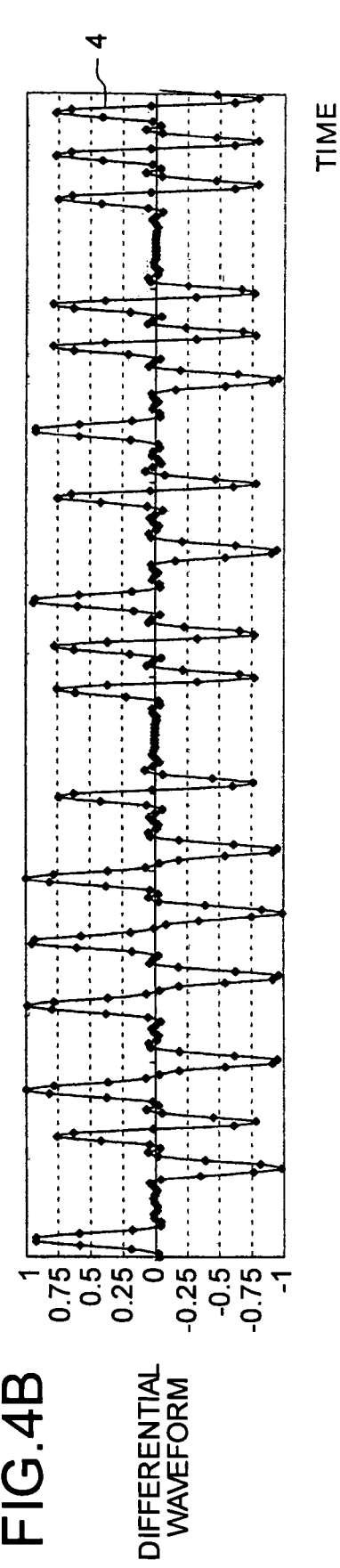

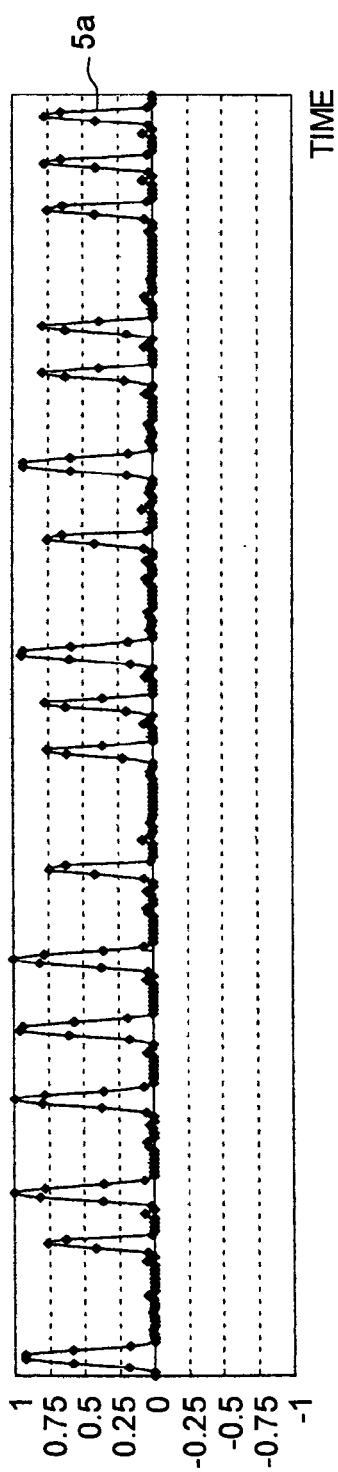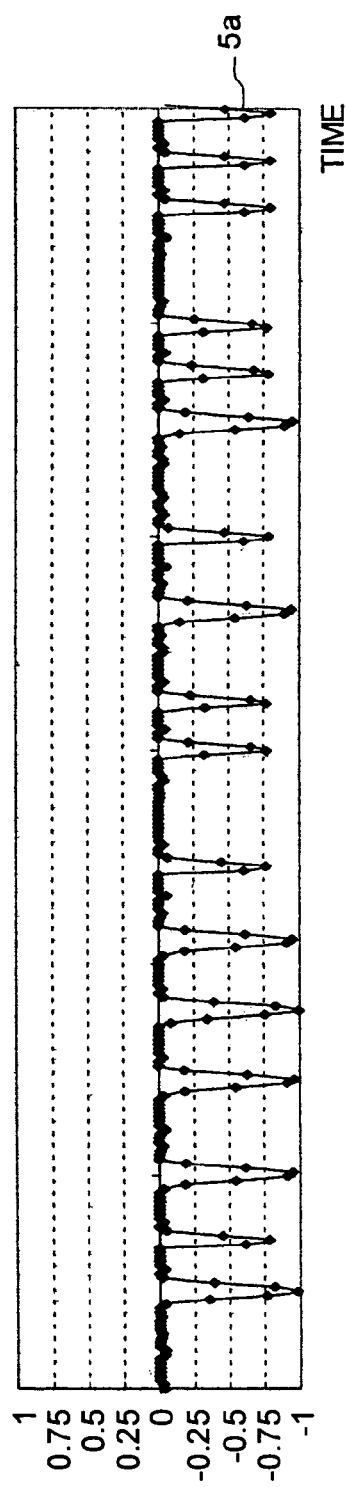

POSITIVE TERNARY

NEGATIVE TERNARY

BAR-CODE READER, METHOD OF READING A BAR CODE AND COMPUTER PRODUCT

BACKGROUND OF THE INVENTION

1.) Field of the Invention

The present invention relates to a bar-code reader, a method of reading a bar code and a computer program for accurately reading a bar code based on optical power of light reflected from the bar code, even when black bars in the bar code are thicker or thinner than a basic width.

2.) Description of the Related Art

Products are managed by providing a bar code to the product and identifying the product by reading this bar code optically. Bar code labels can be prepared at a low cost by printing etc. Therefore, using such bat code labels, it is possible to reduce management cost substantially.

The bar-code labels attached to the products are read using a bar code reader. Such a bar code reader generally includes an optical system like a laser reader, a charged coupled device (CCD) camera etc. The bar code reader receives light that is reflected from the bar code label, determines a pattern of the white bars and the black bars in the bar code from the optical power of the light reflected, and then decodes this pattern to obtain character data that is a pattern of numerals and characters. Such a bar code reader has been disclosed in, for example, Japanese Patent Application Laid-open Application No. 2001-19271.

Therefore, to read a bar code accurately, it is extremely important to compute an array of bar code accurately from the optical power of the reflected light. Various conventional devices to accurately compute an array of a bar code are available.

For example, in a bar-code reader disclosed in Japanese Patent Application Laid-open Publication No. Hei 55-143682, a waveform that indicates an optical power of reflected light is differentiated and then divided into a waveform on a positive side and a waveform on a negative side. A boundary from a black bar to a white bar of a bar code is detected from the waveform on the positive side and a boundary from a white bar to a black bar of a bar code is detected from the waveform on the negative side. This realizes stable reading of the bar code in spite of variation in frequency of the bar code and variation in the amount of light.

The width of black bars and white bars in the bar code has to be in multiples of a basic unit width. When a bar code is read, number of times each black bar and white bar is of this basic unit width is read. But there are cases where the width of each black bar and white bar does not conform to the basic unit width.

For example, due to spreading of ink while printing a bar code, the black bars in the bar code become broader than the desired width. Moreover, the bar code gets blurred from when the bar code is printed until the bar code is really read, so that the width of the black bars becomes narrow than the desired width.

When there is a thickening or thinning of the black bars, the width of black bars and white bars deviates from true multiples of the basic unit width, thereby causing decline in accuracy of reading of the bar code.

However, in a conventional bar-code reader, emphasis has been laid only on accurate reproducing of a bar code array. This has resulted in reproduction of thick or thin bars of the bar code whenever they existed and therefore, the bar code cannot be read accurately.

SUMMARY OF THE INVENTION

It is an object of the present invention to solve at least the problems in the conventional technology.

An optical bar-code reader according to one aspect of the present invention includes an optical scanner that optically scans a bar code to obtain optical power of light reflected from white bars and black bars of the bar code; a differentiation unit that calculates a differential of the optical power to obtain a differential waveform; a dividing unit that divides the differential waveform into a positive waveform and a negative waveform; a bar-code correcting unit that calculates correct widths of black bars in the bar code from the positive waveform and the negative waveform to create corrected bar-code data; and a converter that converts the corrected bar-code data into character data that is an array of numerals and alphabets.

A method of reading a bar code according to another aspect of the present invention includes optically scanning a bar code to obtain optical power of light reflected from white bars and black bars of the bar code; calculating a differential of the optical power to obtain a differential waveform; dividing the differential waveform into a positive waveform and a negative waveform; calculating correct widths of black bars in the bar code from the positive waveform and the negative waveform and creating corrected bar-code data; and converting the corrected bar-code data into character data that is an array of numerals and alphabets.

A computer program according to still another aspect of the present invention makes a computer execute the method according to the above aspect of the present invention.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 2 is a bar-code reader according to a first embodiment of the present invention;

FIG. 3 is an illustration of band-limiting differentiation;

FIG. 4A is graph of an optical power of reflected light and FIG. 4B is a differential waveform of the optical power of reflected light;

FIG. 5A is a positive differential waveform and FIG. 5B is a negative differential waveform;

DETAILED DESCRIPTION OF EXEMPLARY EMBODIMENTS

Exemplary embodiments of a bar-code reader, a method of reading a bar code, and computer program relating to the present invention are explained below with reference to the accompanying drawings.

To start with, a method of reading a bar code according to the present invention is described with reference to FIG. 1. A bar code includes alternately arranged black and white bars. Black bars B1 to B5 and white bars W1 to W4 arranged alternately, form a bar code 1 (see (a) in FIG. 1).

The black bars B1 to B5 and the white bars W1 to W4 have widths in multiples of a basic width f0. The width of the black bar B1 is twice the basic width and the width of the white bar W1 is equal to the basic width. The width of the black bar B2 is equal to the basic width and the width of the white bar W2 is four times the basic width. The width of the black bar B3 is three times the basic width and the width of the white bar W3 is equal to the basic width. The width of the black W4 is twice the basic width.

However, in the bar code 1, a thick black bar is developed due to blurring or spreading of ink during printing and the widths of black bars B1 to B5 have increased as compared to the desired widths. For example, in case of the black bar B1, thick portions B1a and B1b are developed on both sides of the bar. Similar thick portions are developed in the bars B2 to B5 and the amount of extra thickness in all bars is equal.

Figure 1:
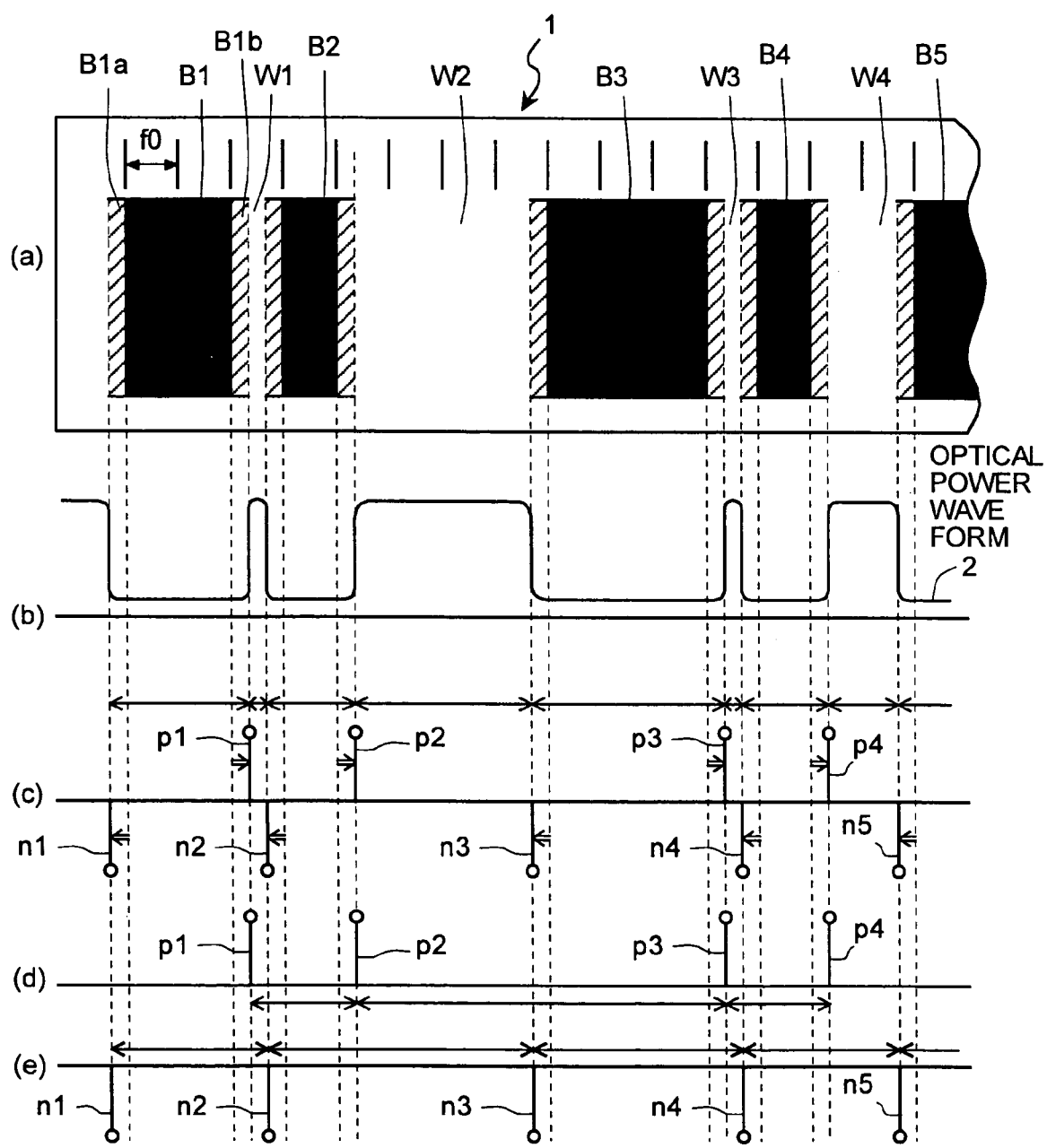
FIG. 1 is to explain a concept of a method of reading a bar code according to the present invention.

Therefore, when an optical power of reflected light is acquired by irradiating light such as a laser beam, etc., on the bar code, a waveform 2 of the optical power of the reflected light includes the extra thickness of the black bar (see (b) in FIG. 1). Concretely, in the waveform 2 of the optical power of the reflected light, a low signal is generated when the laser beam is irradiated on the black bar and a high signal is generated when the laser beam is irradiated on the white bar. In the waveform 2 of the optical power of the reflected light, the width of a low signal increases and the width of a high signal decreases.

When boundaries n1 to n5 from the white bars to the black bars and boundaries p1 to p4 from the black bars to the white bars are detected by differentiating waveform 2 of the optical power of the reflected light, the boundaries n1 to n5 occur earlier than when there is no thickening of black bars and the boundaries p1 to p4 occur later than when there is no thickening of black bars (see (c) in FIG. 1).

Thus, due to a shift in the timing of occurrence of the boundaries n1 to n5 and p1 to p4, the basic width of the bar code cannot be calculated accurately. Moreover, even if the width of the bar code is calculated, when an amplitude of a differential waveform is acquired based on the basic width, the amplitude of the shifted position is acquired as the amplitude of the peak of the differential waveform. In other words, there is an error in reading the amplitude of the peak.

To solve this problem, in the present embodiment, the basic width of the bar code is calculated upon dividing the differentiation information into a positive waveform that takes a positive value and a negative waveform that takes a negative value and the respective amplitudes at the peak time are calculated from the positive waveform and the negative waveform.

The width of the thick black bars is constant for all black bars. Therefore, when the positive side of the differentiation information is targeted, the boundaries p1 to p4 that indicate boundaries from the black bars to the white bars, are shifted in the same direction by the same amount (see (c) in FIG. 1).

Therefore, the distance between each of the boundaries p1 to p4 is a multiple of the basic width even in the case of a thick black bar.

Similarly, when the negative side of the differentiation information is targeted, the boundaries n1 to n5 that indicate boundaries from the white bars to the black bars, are shifted in the same direction by the same amount. Therefore, the distance between each of the boundaries n1 to n5 is a multiple of the basic width even in the case of a thick black bar.

Thus, by using either the boundary from the black bar to the white bar or the boundary from the white bar to the black bar, even in the case of a thick black bar, the basic width can be calculated accurately. Moreover, by acquiring the amplitude information separately for the positive differential waveform and the negative differential waveform, the peak of the amplitude can be captured accurately using the basic width.

In other words, by dividing the differential waveform into a positive waveform and a negative waveform, the thick black bar is attributed to a start-up timing of amplitude acquisition rather than to the shift in the basic width.

A configuration of a bar-code reader according to an embodiment of the present invention is described with reference to FIG. 2. In a bar-code reader, timing signals are generated separately for the positive differential waveform and the negative differential waveform respectively and the amplitudes of the positive differential waveform and the negative differential waveform are acquired based on the respective timing signals. Then, the amplitudes of the positive differential signal and the negative differential signal are synthesized.

Concretely, the bar-code reader includes an optical scanner 11, an analog processor 12, and a digital processor 13. The optical scanner 11 includes a laser diode 11a and a polygon mirror 11b. A laser beam emitted from the laser diode 11a is irradiated on the bar code 1. The bar code 1 is scanned by changing the position of irradiation of the laser beam by rotating the polygon mirror 11b.

The analog processor 12 includes an optical receiver 12a, an amplifier 12b, and an AD converter 12c. The optical receiver 12a is realized by an optoelectric transfer element like a photodiode and outputs an optical power of the laser beam that is reflected from the bar code 1. The amplifier 12b amplifies the optical power of the reflected light and the AD converter 12c converts it to a digital signal. The digital signal is input to the digital processor 13.

The digital processor 13 includes an extractor 21, a band-limiting differential processor 22, a sign-dividing processor 23, a positive amplitude extractor 24, a negative amplitude extractor 25, a sign synthesizer 26, a width-number counter 27, and a character composer 28.

The extractor 21 extracts a part corresponding to the bar code from the digital signal and transmits it to the band-limiting differential processor 22. In other words, in this extraction process, an area corresponding to the bar code that has high amplitude and frequency is extracted from the digital signal.

The band-limiting differential processor 22 calculates the basic width of the bar code from the output of the extractor 21 and performs differentiation of the optical power of the reflected light in a band of frequency that is less than the frequency of the basic width.

FIG. 3 is an illustration of band-limiting differentiation. Regarding the optical power of the reflected light, the frequency suitable to the basic width can be the frequency in a wide range from low frequency to high frequency, due to scaling, reading position, and inclination of the bar code. Therefore, to perform differentiation corresponding to all frequencies of the optical power of the reflected light, a wide bandwidth as illustrated in FIG. 3 is necessary.

However, for reading the bar code, the widths of black bars and white bars is useful information. The widths of black bars and white bars is in multiples of the basic width. Therefore, the required information is indicated by a frequency that is less than the frequency of the basic width. The frequency greater than that of the basic width can be assumed to be noise that is unnecessary for reading of the bar code.

Therefore, as illustrated by a bandwidth 3a, by performing differentiation of the optical power of the reflected light with a frequency not greater than that of the basic band width of the bar code, the frequency information is acquired by eliminating the area having high frequency. This enables to improve an SN ratio (signal to noise ratio) and to reduce the processing load of the differentiation process.

In the band-limiting differential processor 22, a basic-width calculation 31 differentiates the extracted optical power of the reflected light and divides it into a positive and a negative (sign division 33). The frequency of the basic width is calculated from the positive differential waveform and the negative differential waveform by an FFT (fast Fourier transform) 34. Irrespective of the presence or absence of a thick black bar, the positive differential waveform and the negative differential waveform are separated by a distance that is in multiples of the basic width. Therefore, the bandwidth can be calculated from the frequency element obtained by the FFT 34.

In particular, the positive differential waveform and the negative differential waveform are more than twice the basic width. Therefore, out of the frequency elements obtained by the FFT 34, the frequency of an element having the highest frequency becomes the frequency of the basic width. So, the basic width can be calculated by detecting an element that has the highest frequency from the calculation by FFT 34 and assuming the frequency of this element as the frequency of the basic width.

The band-limiting differential processor 22 performs a band-limiting differentiation 32 of the optical power of the reflected light. The band-limiting differentiation 32 enables to generate a differential waveform 4 as illustrated in FIG. 4B from an optical power 2a of the reflected light that is illustrated in FIG. 4A.

As illustrated in FIG. 4A, the optical power 2a of the reflected light corresponds to an array of the bar code. The optical power 2a of the reflected light has an area of high optical power that corresponds to the white bars and an area of low optical power that corresponds to the black bars. On the other hand, the differential waveform 4 takes a positive value when the optical power 2a of the reflected light shifts from the low area to the high area and a negative value when the optical power 2a of the reflected light shifts from the high area to the low area. The band-limiting differential processor 22 outputs the differential waveform 4 to the sign-dividing processor 23.

The sign-dividing processor 23 divides the differential waveform 4 into a positive value and a negative value and forms a positive differential waveform 5a and a negative differential waveform 5b. FIG. 5A is an illustration of the positive differential waveform 5a that is formed from the differential waveform 4. As illustrated in this diagram, when the amplitude of the differential waveform 4 is a positive value, the positive differential waveform 5a adopts this positive value and when the amplitude of the differential waveform 4 is a negative value, the amplitude in the positive differential waveform 5a is assumed to be '0'. On the other hand, FIG. 5B is an illustration of the negative waveform 5b that is formed from the differential waveform 4. As illustrated in this diagram, when the amplitude of the differential waveform 4 is a positive value, the amplitude of the negative waveform 5b is assumed to be '0' and when the amplitude of the differential waveform 4 is a negative value, this negative value is adopted. The sign-dividing processor 23 transmits the positive differential waveform 5a to the positive amplitude extractor 24 and the negative differential waveform 5b to the negative amplitude extractor 25.

The positive amplitude extractor 24 uses the basic width calculated by the band-limiting differential processor 22, to ternarize the positive differential waveform 5a. Concretely, the positive amplitude extractor 24 extracts a timing signal with a timing-signal extraction 41, performs an amplitude extraction 42 of the positive differential waveform 5a based on the timing signal, and then performs a ternarization 43 of the amplitude extraction result.

In this case, the timing signal extracted is a signal that specifies the timing of acquiring the amplitude from the positive differential waveform 5a. A thick black bar is developed in the bar code 1. However, the positive differential waveform 5a includes only a peak indicating a boundary from a black bar to a white bar. As the boundary from a black bar to a white bar is shifted in the same direction, all peaks can be acquired accurately by acquiring the amplitude of the positive differential waveform 5a based on the timing signal of the basic width interval.

Therefore, the timing signal extraction 41 detects a first peak of the positive differential waveform 5a and with the first peak as a base point, extracts the timing signal of the basic width interval. The basic width calculated by the band-limiting differential processor 22 is used as the basic width.

Figure 6A:
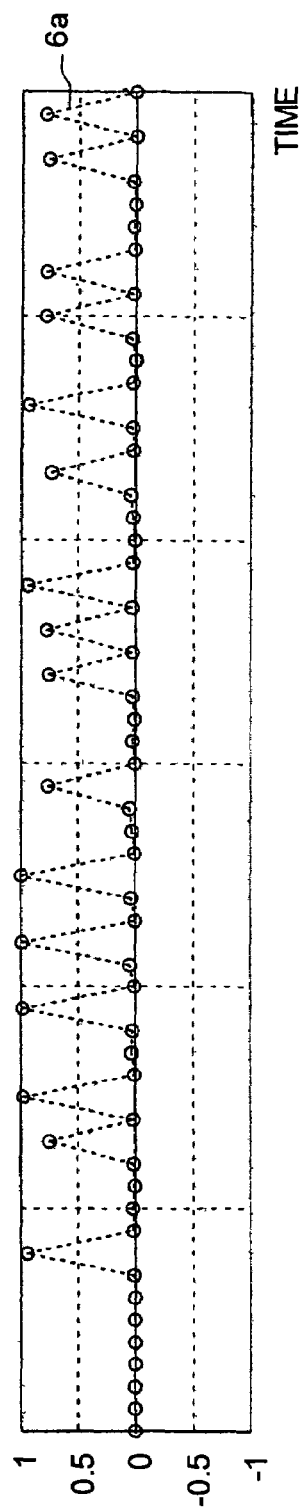
FIG. 6A is a ternary positive differential waveform and FIG. 6B is a ternary negative differential waveform.

The amplitude extraction 42 acquires the amplitude of the positive differential waveform 5a based on the timing signal extracted by the timing signal extraction 41. Moreover, the ternarization 43 assigns the amplitude acquired by the amplitude extraction to any one of values 1, 0, and −1. The result of the ternarization is illustrated in FIG. 6A.

The value 1 in the ternarization denotes the boundary from a black bar to a white bar and the value 0 denotes continuation of a black bar or a white bar. Moreover, the value −1 in the ternarization denotes the boundary from a white bar to a black bar. However, since the positive differential waveform 5a does not include amplitude less than zero, the value of −1 does not appear and only the value 1 or 0 appears in the positive ternary signal 6a.

Moreover, the negative amplitude extractor 25 uses the basic width calculated by the band-limiting differential processor 22, to ternarize the negative differential waveform 5b. Concretely, the negative amplitude extractor 25 extracts a timing signal with a timing-signal extraction 44, performs an amplitude extraction 45 of the negative differential waveform 5b based on the timing signal, and then performs a ternarization 46 of the amplitude extraction result.

The timing signal extracted is a signal that specifies the timing of acquiring the amplitude from the negative differential waveform 5b. There is a thick black bar in the bar code 1. However, the negative differential waveform 5b includes only a peak indicating a boundary from a white bar to a black bar. As the boundary from a white bar to a black bar is shifted in the same direction, all peaks can be acquired accurately by acquiring the amplitude of the negative differential waveform 5b based on the timing signal of the basic width interval.

Therefore, the timing-signal extraction 44 detects a first peak of the negative differential waveform 5b and with the first peak as a base point, extracts the timing signal of the basic width interval. The basic width calculated by the band-limiting differential processor 22 is used as the basic width.

Figure 6B:
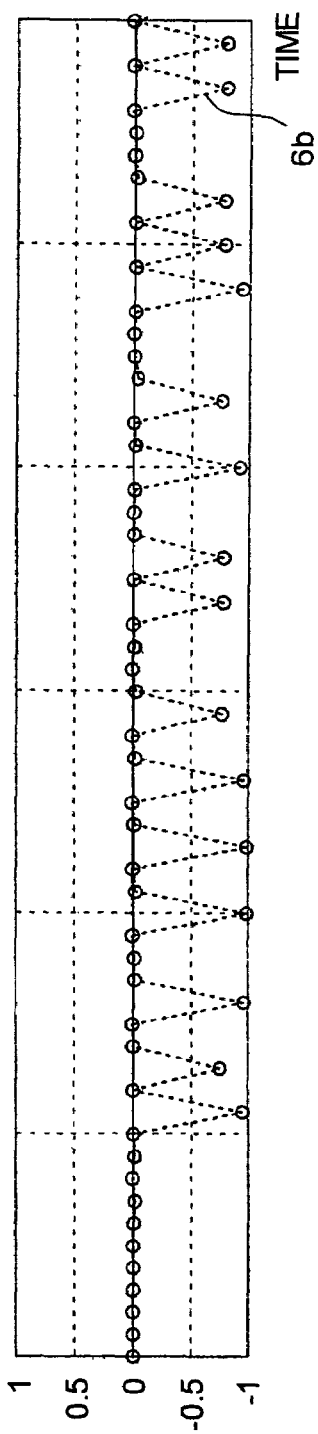

In the amplitude extraction 45 acquires the amplitude of the negative differential waveform 5b based on the timing signal extracted by the timing signal extraction 44. Moreover, the ternarization 46 assigns the amplitude acquired by the amplitude extraction to any one of values 1, 0, and −1. The result of the ternarization is illustrated in FIG. 6B.

Since the negative differential waveform 5b does not include amplitude greater than zero, the value 1 does not appear and only the value 0 or −1 appears in the negative ternary signal 6b.

The sign synthesizer 26 forms a synthesized ternary signal by synthesizing the positive ternary signal 6a and the negative ternary signal 6b and outputs it to the width-number counter 27. The signals 6a and 6b are synthesized such that a distance between the peak of the positive ternary signal 6a and the peak of the negative ternary signal 6b is an integral multiple of the basic width. This enables to achieve a synthesized ternary signal with a corrected thick black bar in the bar code 1.

Concretely, the positive ternary signal 6a and the negative ternary signal 6b both undergo sampling in the basic width. Therefore, synchronizing sampling timings performs the synthesizing. This enables to make the distance between the peak of the positive ternary signal 6a and the peak of the negative ternary signal 6b, an integral multiple of the basic width.

For synchronizing the sampling timings, the first sampling timing of the positive ternary signal 6a and the first sampling timing of the negative ternary signal 6b may be synchronized. However, there may be a sampling dropout in the positive ternary signal 6a and the negative ternary signal 6b.

When there is a sampling dropout, if the synthesis is performed by synchronizing the first sampling timing of the positive ternary signal 6a and the first sampling timing of the negative ternary signal 6b, a peak is suppressed due to cancellation (counteraction) of the positive peak and the negative peak. Due to this, the bar-code data cannot be obtained accurately.

Therefore, during synchronization of the sampling timing, it is desirable to control the base point of synchronization such that no peak is suppressed. To perform synthesis without suppressing the peak, concretely, the synthesis is carried out by shifting the sampling timing that is a base point of the positive ternary signal 6a and the sampling timing that is a base point of the negative ternary signal 6b. Thus, a plurality of synthesized ternary signals having different base points is formed. By adopting a signal that has maximum energy among the synthesized ternary signals, a synthesized ternary signal without the suppressed peak can be output.

If the sampling timing of the synthesized ternary signal is k (1≦k≦n), the value in the sampling timing of the synthesized ternary signal k is S(k), and the Energy E of the synthesized ternary signal is calculated as:

$$E = \frac{1}{n}\sum_{k=1}^{n} S(k)^2 \quad (1)$$

the energy E may be calculated for a plurality of synthesized ternary signals and compared.

Figure 7A:
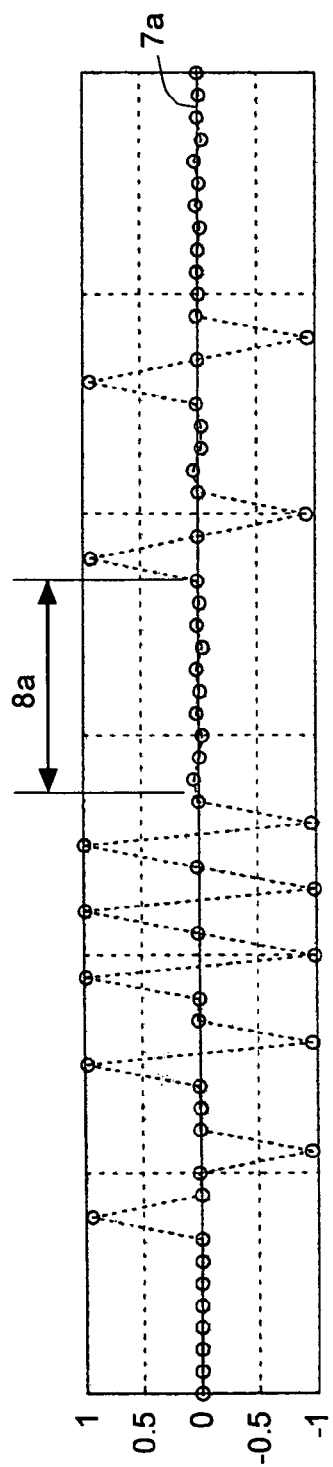
FIGS. 7A to 7C illustrate examples of synthesis of sampling timing.
Figure 7B:
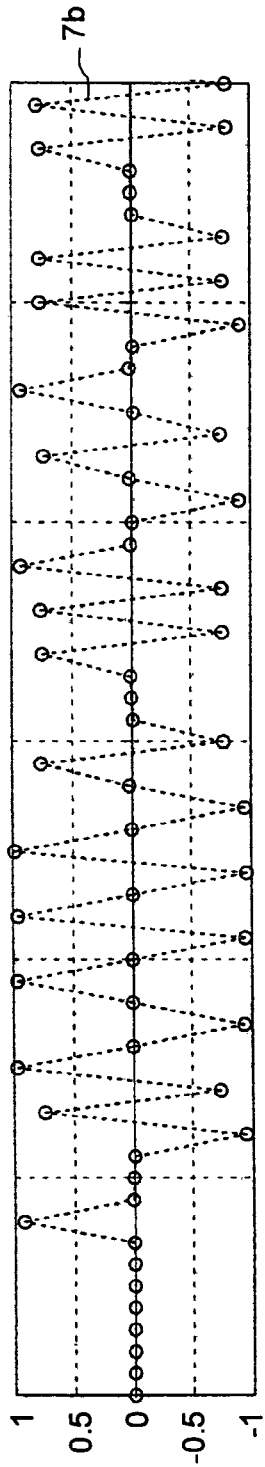

FIG. 7A illustrates a synthesized ternary signal 7a that is synthesized by synchronizing the first sampling timing of the positive ternary signal 6a and the first sampling timing of the negative ternary signal 6b. FIG. 7B illustrates a synthesized ternary signal 7b that is synthesized by synchronizing a first sampling timing of the positive ternary signal 6a and a second sampling timing of the negative ternary signal 6b. Similarly, FIG. 7C illustrates a synthesized ternary signal 7c that is synthesized by synchronizing the second sampling timing of the positive ternary signal 6a and the first sampling timing of the negative ternary signal 6b.

Figure 7C:
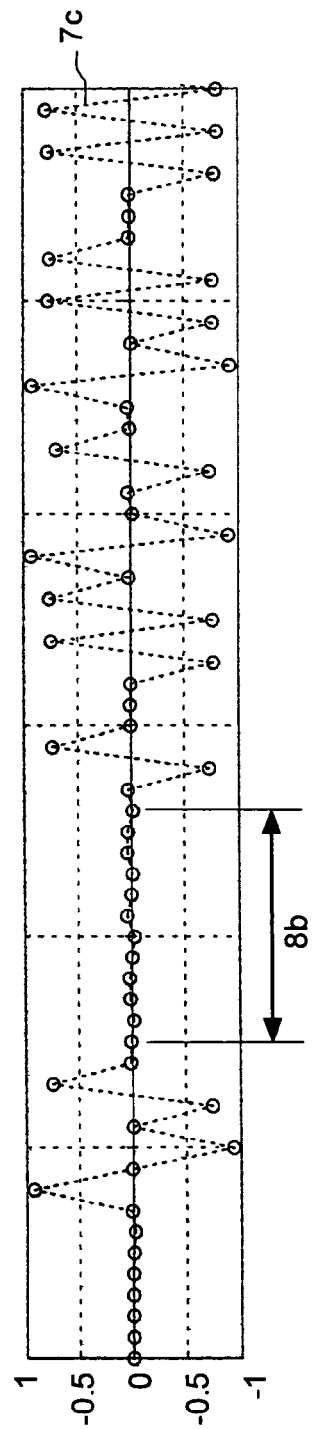

As shown in FIGS. 7A to 7C, there is a peak suppression 8a in the synthesized ternary signal 7a and a peak suppression 8b in the synthesized ternary signal 7c. Due to this, when the energies of the synthesized ternary signal 7a, 7b, and 7c are compared, the energy of the synthesized ternary signal 7b is maximum. Therefore, the sign synthesizer 26 outputs the synthesized ternary signal 7b to the width-number counter 27.

The synchronized control of the sampling timing need not be necessarily performed by this method. Any method that can carry out the synchronized control such that the energy of the synthesized ternary signal becomes maximum can be used. For example, an ideal value of energy of a synthesized ternary signal can be obtained by calculating the energy of the positive ternary signal 6a and the negative ternary signal 6b and then adding them. The synchronized control of the sampling timings may be carried out either to match the value of the synthesized ternary signal with the ideal value of energy of the synthesized ternary signal or to bring the value of the synthesized ternary signal closest to the ideal value of energy of the synthesized ternary signal.

The width-number counter 27 reproduces the bar code from the synthesized ternary signal output by the sign synthesizer 26. Concretely, the area (value) from the value −1 to 1 of the synthesized ternary signal is detected as a black bar and the area (value) from the value 1 to −1 is detected as a white bar. The width number is calculated in terms of multiples of the basic width of the black bar and white bar that are detected and an array of the bar code 1 is reproduced. The thick black bar in the bar code 1 that is reproduced is corrected. The corrected bar-code data is transmitted to the character composer 28.

The character composer 28 converts the corrected bar-code data to character data that is an array of numerals and alphabets and transmits it to an external unit like a POS (point of sales) terminal.

Thus, in the bar-code reader according to the first embodiment, the optical power of the reflected light is differentiated and then divided into a positive differential waveform and a negative differential waveform. The amplitudes of the positive differential waveform and the negative differential waveform are acquired based on the respective timing signals, and then synthesized. This enables to read the bar code accurately by correcting the thickening and thinning of the bar code.

The second embodiment of the present invention is described next. In the first embodiment, the timing signal to acquire the amplitude from the positive differential signal and the timing signal to acquire the amplitude from the negative differential signal are extracted separately. However, in the second embodiment, after extracting the timing signal corresponding to the positive differential signal, the amplitude from the negative differential signal is acquired by using the timing signal obtained by delaying the timing signal corresponding to the positive differential signal by a predetermined amount of time.

Figure 8:
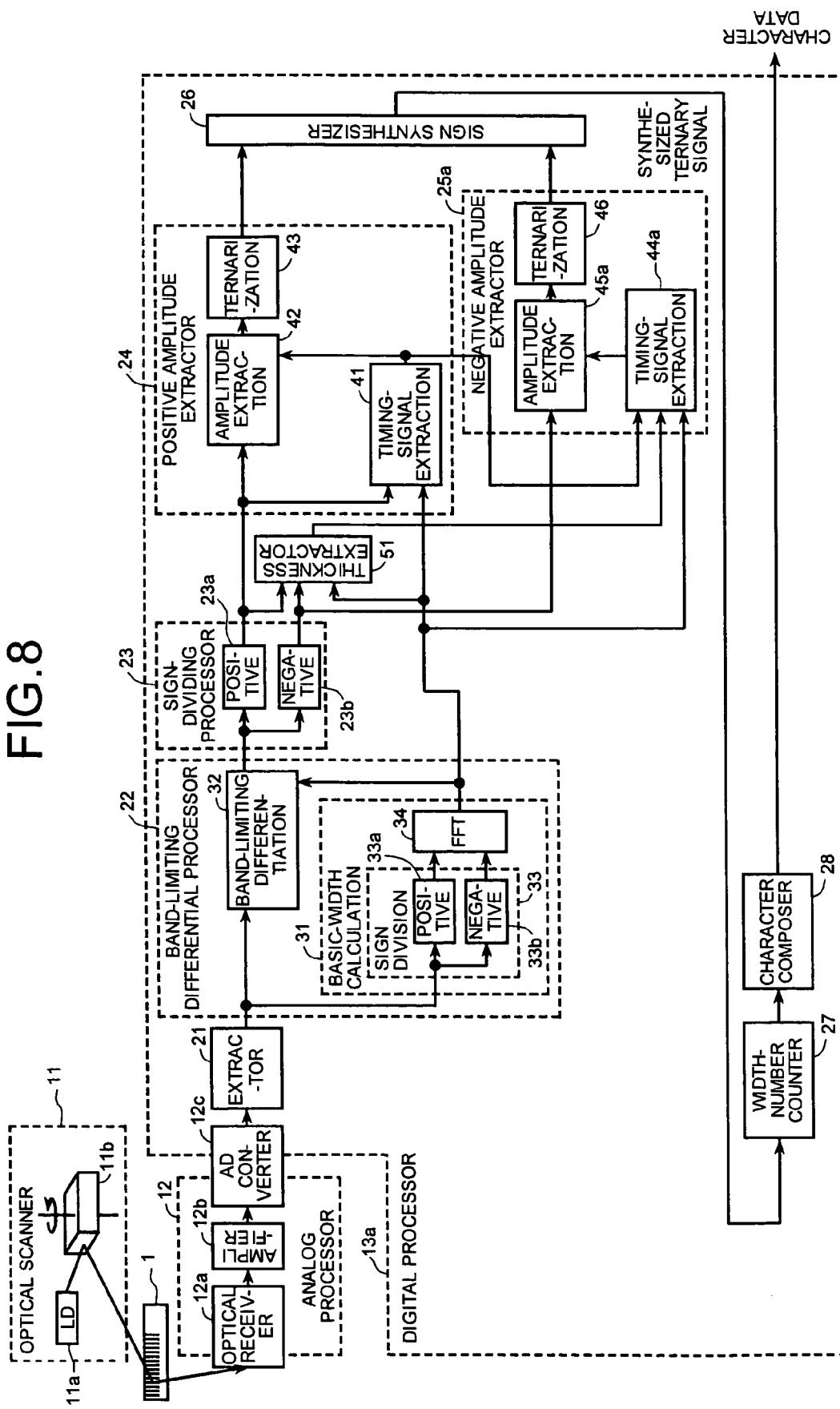
FIG. 8 is a bar-code reader according to a second embodiment of the present invention.

FIG. 8 is a bar-code reader according to the second embodiment of the present invention. The bar-code reader illustrated in FIG. 8 includes a thickness extractor 51 that extracts the thickness of a black bar in the bar code from the positive differential signal and the negative differential signal output by the sign-dividing processor 23. The negative amplitude extractor 25a causes a delay in the timing signal extracted by the positive amplitude extractor 24, based on the thickness and acquires the amplitude of the negative differential signal.

Since the rest of the configuration and operation are similar to the bar-code reader that is shown in the first embodiment, the same reference numerals are used for the identical components and the description is omitted.

Figure 9:
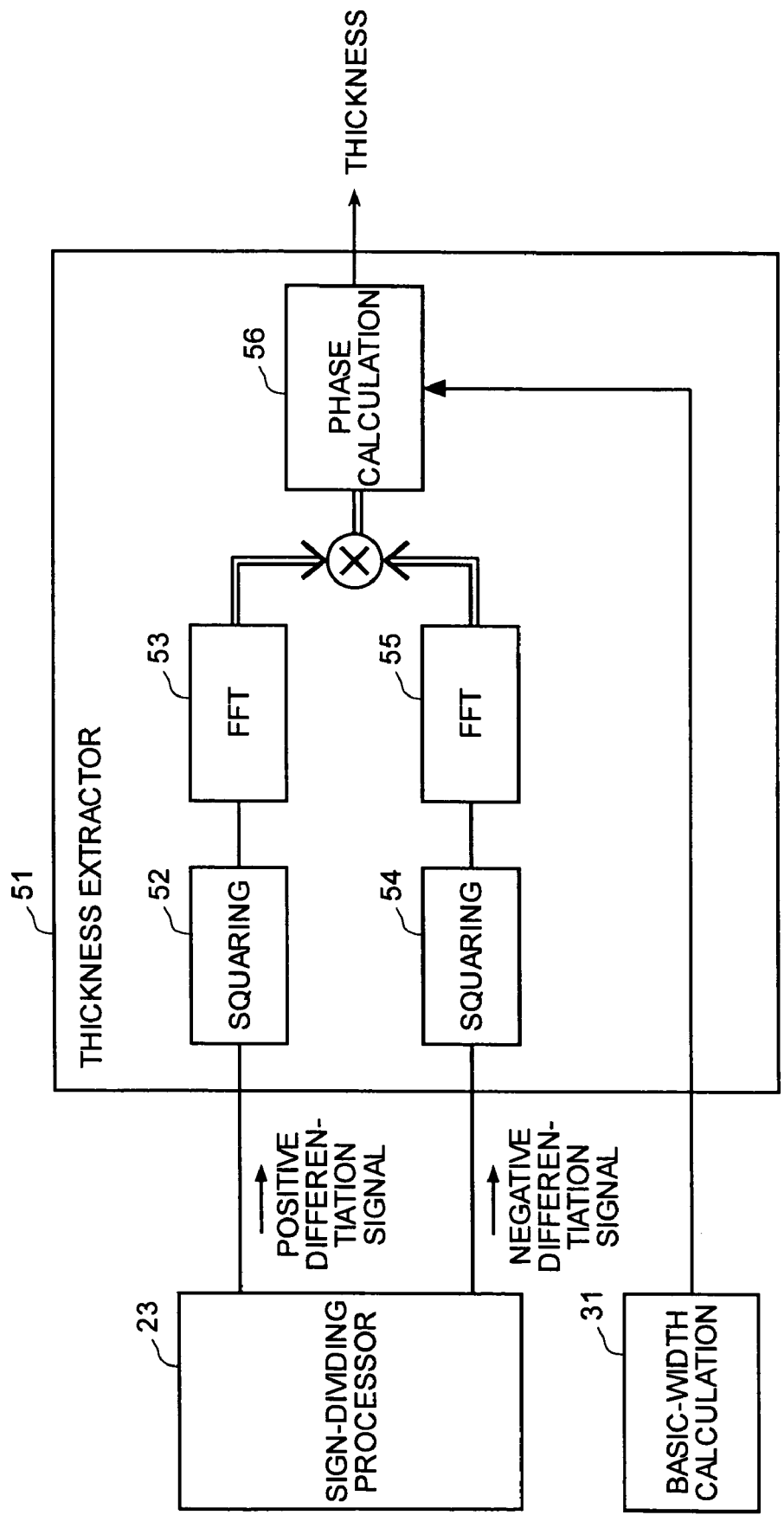
FIG. 9 is an illustration of a thickness extraction process.

The thickness extractor 51, concretely, extracts thickness from the correlation between the positive differential wavelength and the negative differential wavelength. FIG. 9 is an illustration of a process executed by the thickness extractor 51. As shown in FIG. 9, the thickness extractor 51 performs squaring 52 of the positive differential signal output by the sign-dividing processor 23 and then the squared signal is transformed in an FFT 53. Similarly, the thickness extractor 51 performs squaring 54 of the negative differential signal output by the sign-dividing processor 23 and then the squared signal is transformed in an FFT 55. The squaring 52 and 54 are not indispensably necessary and the positive differential waveform and the negative differential waveform may be transformed directly in the FFT 53 and in the FFT 55 respectively.

Further, the correlation between the FFT 53 and the FFT 55 is acquired and a phase calculation 56 is performed using the basic width calculated by the basic-width calculation 31. The phase difference obtained by the phase calculation 56 is a phase difference between the positive differential waveform and the negative differential waveform, i.e. an excessive thickness of the black bar.

After being extracted, the timing signal corresponding to the positive differential waveform is delayed by an amount of the phase difference calculated by the phase calculator 56. This enables to obtain a timing signal corresponding to the negative differential signal.

The thickness extraction need not be necessarily done by calculating the phase difference. Any method that enables to accurately calculate the excessive thickness of the black bar can be employed. For example, widths of black bars B1 to B4 and widths of white bars W1 to W4 can be compared with the basic width and the excessive thickness may be calculated from the comparison results.

Figure 10:
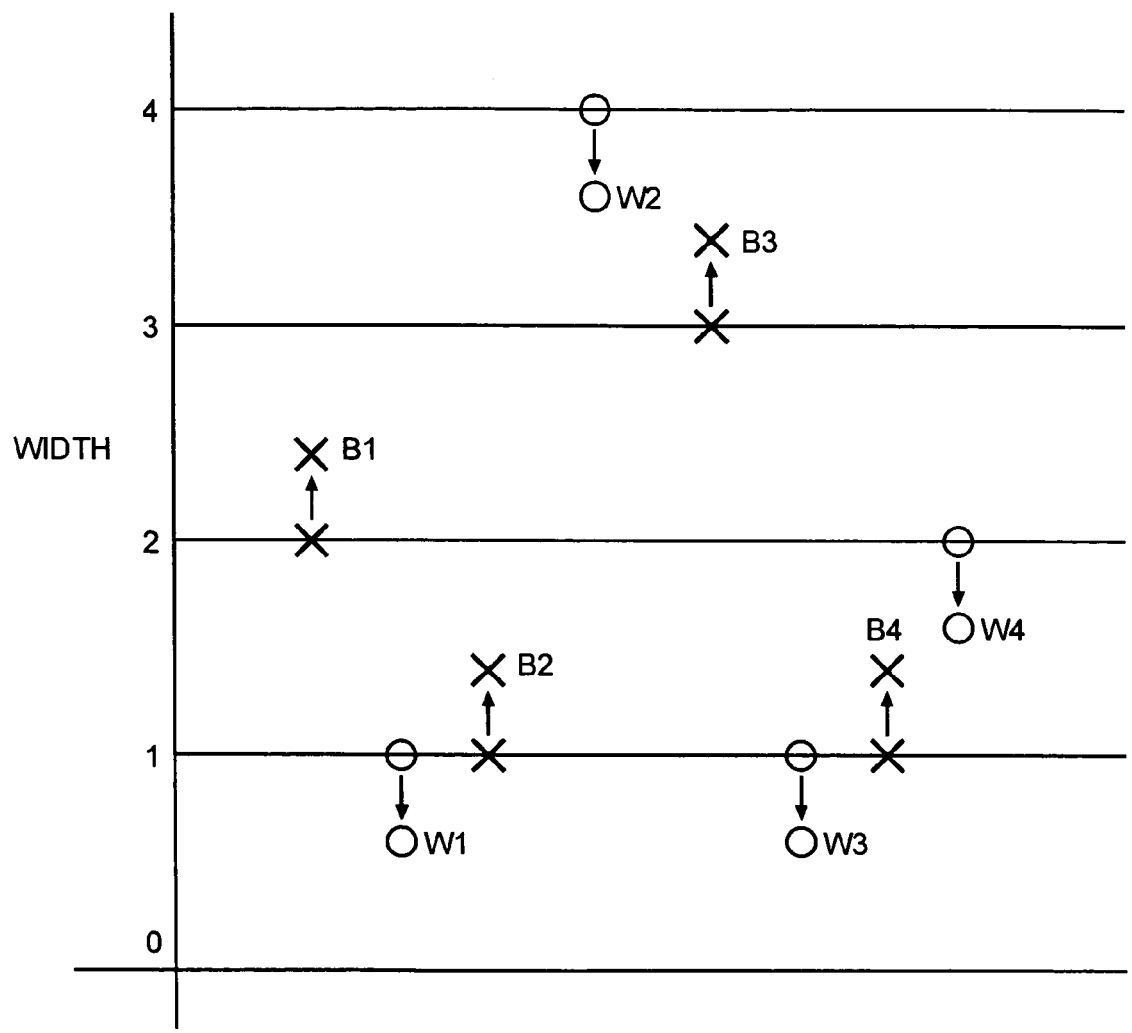
FIG. 10 is an illustration of a concept of thickness extraction.

FIG. 10 is an illustration of a concept of thickness extraction by comparison with the basic width. Due to the thickness of a black bar in the bar code 1, (see FIG. 1) the width of the black bars B1 to B4 becomes greater than the original width and the width of the white bars W1 to W4 becomes smaller than the original width. As illustrated in FIG. 10, the original width of the black bar B1 is twice the basic width (width number 2), however the width number of the black bar B1 in the bar code 1 becomes greater by the amount of excessive thickness. Similarly, the original width of black bars B2, B3, and B4 are respectively equal to (width number 1), three times (width number 3), and equal to (width number 1) the basic width, however the width numbers of the black bars B2, B3, and B4 in the bar code 1 become greater by the respective amount of excessive thickness.

On the other hand, the original width of the white bar is equal to the basic width (width number 1), but the width number of the white bar W1 in the bar code 1 becomes smaller by the amount of excessive thickness of the black bar. Similarly, the original widths of the white bars W2, W3, and W4 are respectively four times (width number 4), equal to (width number 1), and twice (width number 2) the basic width, however the width numbers of the white bars W2, W3, and W4 in the bar code 1 become smaller by the respective amount of the excessive thickness of the black bar.

The amount of increase in the width numbers of the bars B1 to B4 is equal to the amount of decrease in the width numbers of the bars W1 to W4. Therefore, the excessive thickness can be calculated by dividing each width number by the basic width.

Figure 11:
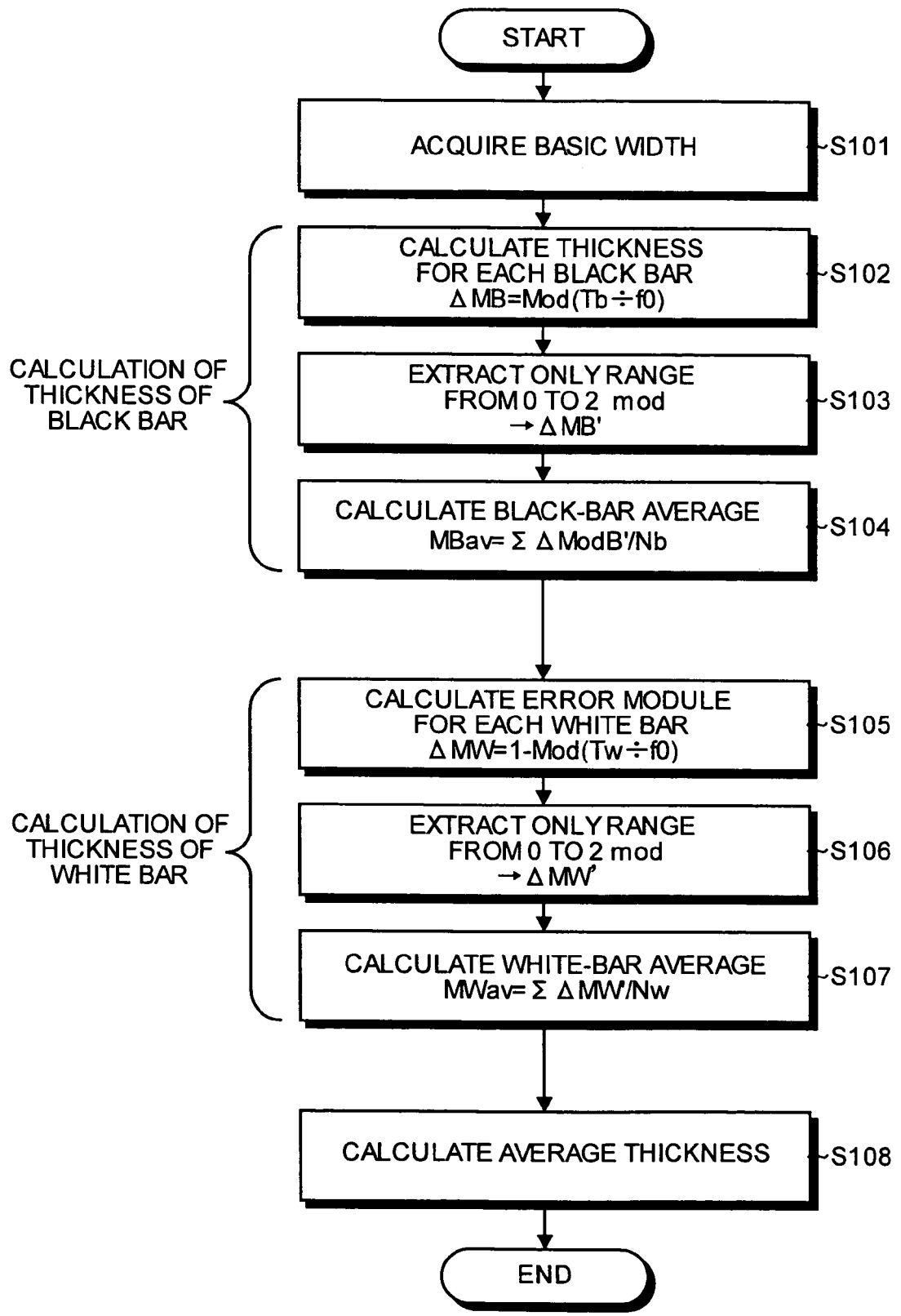
FIG. 11 is a flow chart of a process of the thickness extraction.

Further, a process of thickness extraction by comparison with the basic width is described in detail with reference to the flowchart in FIG. 11. To start with, the thickness extractor 51 acquires a basic width f0 calculated by the basic-width calculation 31 (step S101).

Further, the thickness extractor 51 calculates an excessive thickness of each black bar (step S102). Concretely, if the width of the black bar is Tb, the excessive thickness of the black bar is ΔMB, and the modulo is Mod, then the excessive thickness of the black bar is calculated by $$\Delta MB = \mathrm{Mod}(Tb \div f0).$$

When ΔMB calculated is in a range of 0 to 2.0, the thickness extractor 51 adopts this value as ΔMB'. If ΔMB is not less than 2.0, the calculated value is not adopted (step S103). After calculating ΔMB' for all black bars by the steps S102 and S103, the thickness extractor 51 calculates an average excessive thickness MBav of black bars (step S104). Concretely, if the total number of bars is nb, then MBav is calculated by:

$$MBav = \frac{\sum \Delta MB'}{nb} \qquad (2)$$

Further, the thickness extractor 51 calculates thickness from each white bar (step S105). Concretely, if the width of the white bar is Tw, the thickness calculated from the white bar is ΔMW, and the modulo is Mod, then the thickness is calculated by:

$$\Delta MW = 1 - \mathrm{Mod}\,(Tw \div f0).$$

When ΔMW calculated is in a range of 0 to 2.0, the thickness extractor 51 adopts this value as ΔMW'. If ΔMW is not less than 2.0, the calculated value is not adopted (step S106). After calculating ΔMW' for all white bars by the steps S105 and S106, the thickness extractor 51 calculates an average thickness MWav of white bars from ΔMW' (step S107). Concretely, if the total numbers of white bars is nw, then MWav is calculated by:

$$MWav = \frac{\sum \Delta MW'}{nw} \quad (3)$$

Further, the thickness extractor 51 calculates an average thickness Mav from MBav and MWav (step S108). Concretely, the thickness extractor 51 compares the deviation of each element of ΔMB' and the deviation of each element of ΔMW' and selects the lesser of the two as average thickness Mav.

Since ΔMB' and ΔMW' are formed by elements having values in the range of 0 to 2.0, it is classified into either 'a group of those thickened from 1 mod' or 'a group of those thinned from 1 mod and those thinned from 2 mod'. The deviation of elements in the 'group of those thickened from 1 mod' is less than the deviation of elements in the 'group of those thinned from 1 mod and those thinned from 2 mod'. Therefore, an average value of elements in the group for which the deviation is smaller is taken. This enables to obtain an average value of 'the group of those thickened from 1 mod' and to calculate the thickening of 1 mod.

The thickness extractor 51 transmits Mav as a thickness, to the negative amplitude extractor 25a. The negative amplitude extractor 25a acquires the amplitude of the negative differential signal by a timing signal obtained by delaying by Mav, the timing signal corresponding to the positive differential signal.

Thus, in the bar-code reader according to the second embodiment, the thickness of the bar code is calculated from the positive differential signal and the negative differential signal. The amplitude of the positive differential signal is acquired by extracting the timing signal corresponding to the positive differential signal and the amplitude of the negative differential signal is acquired by using the timing signal that is obtained by delaying the timing signal corresponding to the positive differential signal according to the thickness. Thus the amplitudes of the positive differential signal and the negative differential signal are synthesized. This enables to perform correction of thickening and thinning of the bar code and to read the bar code accurately.

In the second embodiment, the timing signal used in amplitude extraction of the negative differential signal is generated from the timing signal corresponding to the positive differential signal. However, the timing signal corresponding to the negative differential side may be generated beforehand and the timing signal that is used in the amplitude extraction of the positive differential signal may be generated by delaying the timing signal that is generated beforehand.

In the first and the second embodiments described above, the synthesis is performed after acquiring the amplitudes, based on the respective timings from the positive differential signal and the negative differential signal. However in a third embodiment, the thickness is extracted from the positive differential signal and the negative differential signal, and after performing the synthesis of the positive differential signal and the negative differential signal based on the thickness, the amplitude is acquired from the synthesized differential signal.

Figure 12:
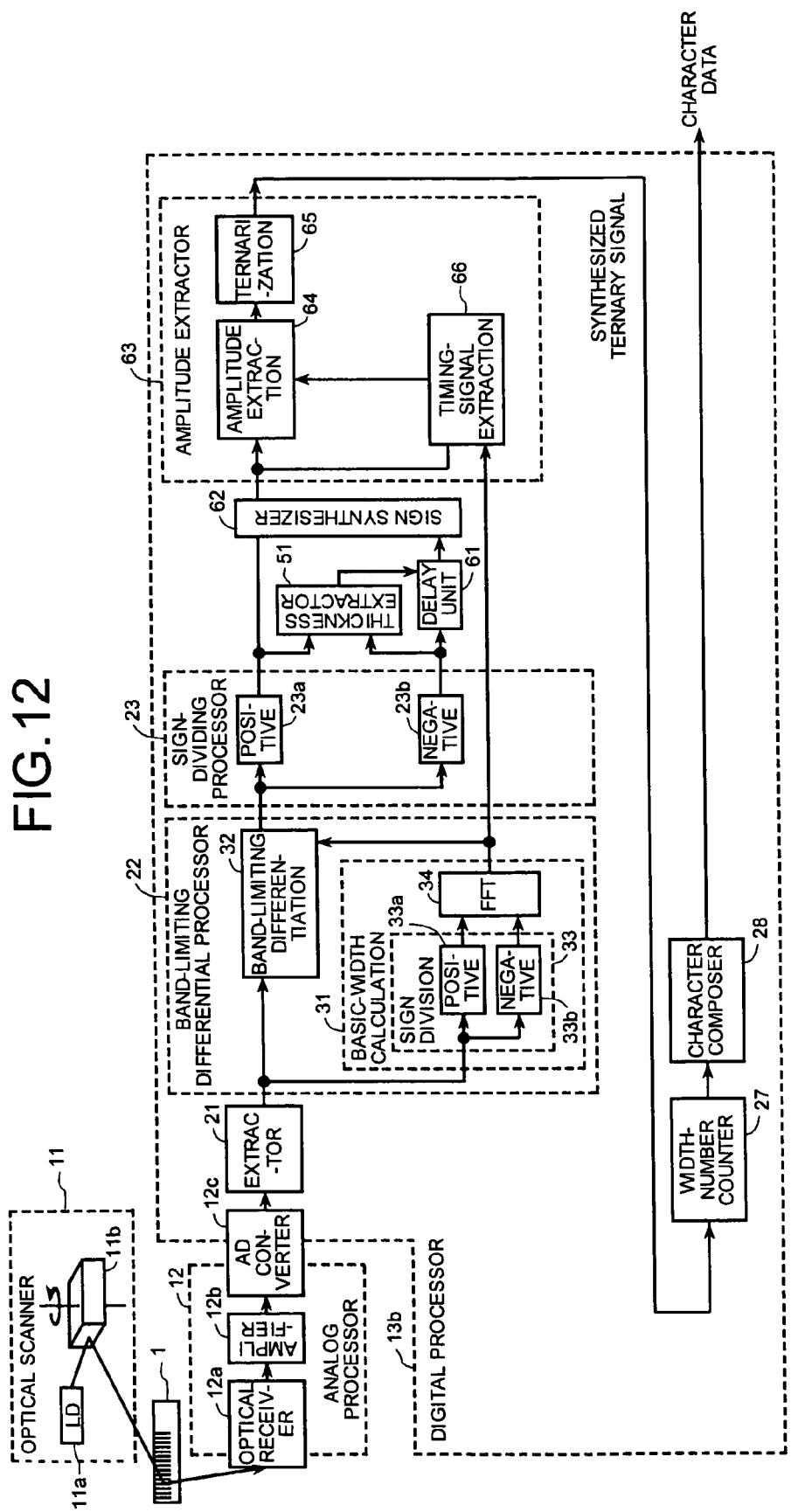
FIG. 12 is a bar-code reader according to a third embodiment of the present invention.

FIG. 12 is a bar-code reader according to the third embodiment of the present invention. The bar-code reader illustrated in FIG. 12 includes a delay unit 61, a sign synthesizer 62, and an amplitude extractor 63. Since the rest of the configuration and operation are similar to the bar-code reader in the second embodiment, the same reference numerals are used for the identical components and the description is omitted.

The delay unit 61 causes a delay in the negative differential waveform based on the thickness extracted by the thickness extractor 51. The sign synthesizer 62 synthesizes the positive differential waveform output by the sign-dividing processor 23 and the negative differential waveform output by the delay unit 61.

In this case, the negative differential waveform output by the delay unit 61 is delayed corresponding to the thickness of the bar code 1. Therefore, the synthesized differential waveform that is formed by the sign synthesizer 62 is a differential waveform that is subjected to thickness correction of the bar code 1 and the distance between a peak on the positive side of the differential waveform and a peak on the negative side of the differential waveform is an integral multiple of the basic width.

Therefore, the amplitude extractor 63 performs the extraction of the amplitude of the synthesized differential waveform using a single timing signal. This enables to acquire both, the peak of the positive amplitude and the peak of the negative amplitude, accurately.

Concretely, the amplitude extractor 63, using the basic width calculated by the basic-width calculation 31, ternarizes the synthesized differential waveform generated by the sign synthesizer 62. More concretely, the amplitude extractor 63 extracts the timing signal by a timing-signal extraction 66, executes an amplitude extraction 64 of the synthesized differential waveform based on the timing signal extracted, and performs a ternarization 65 of the result of the amplitude extraction.

The timing-signal extraction 66 detects the first peak of the synthesized differential waveform and extracts a timing signal that has a basic width interval with the first peak as a base point. The basic width calculated by the band-limiting differential processor 22 is used as the basic width in this case.

The amplitude extraction 64 acquires the amplitude of the synthesized differential waveform based on the timing signal extracted by the timing extraction 66. Moreover, the ternarization 65 assigns the amplitude acquired by the amplitude extraction 64 to any one of the values '1, 0, and −1' and outputs a synthesized ternary signal.

Thus, in the bar-code reader described in the third embodiment, the thickness is calculated based on the positive differential waveform and the negative differential waveform. The negative differential waveform is delayed based on the thickness. The synthesized differential waveform is formed by synthesizing the positive differential waveform and the negative differential waveform. This enables to achieve a synthesized differential waveform that is subjected to the correction of the thickening and thinning of the bar code and to read the bar code accurately.

Moreover, in the third embodiment, based on the thickness, the negative differential waveform is delayed and synthesized with the positive differential waveform. However, based on the thickness, the positive differential waveform may be delayed and synthesized with the negative differential waveform.

Furthermore, the first, the second, and the third embodiments are described with reference to an example of the thick black bar that has an increased width as compared to the original width of the black bar. It is needless to mention that a correction can be carried out by an identical process in a case of a thin black bar that has a decreased width as compared to the original width of the black bar.

In the first, the second, and the third embodiments, the FFT 34 calculates the basic width from the positive differential waveform and the negative differential waveform. However, the method for calculating the basic width need not be necessarily restricted to that employing the FFT. The basic width may be calculated by employing any method that does not depend on the thickening and the thinning of the bar code.

Furthermore, a computer program may realize the method of reading the bar code. The computer program may be stored in a computer-readable medium such as a ROM and a CPU may execute the program.

According to one aspect of the present invention, in a bar-code reader, a differential waveform of an optical power of reflected light is formed by a differentiating unit, and is divided into a positive waveform and a negative waveform. Corrected bar-code data, in which correct width of black bars of the bar code is computed using the positive waveform and the negative waveform, is generated. The corrected bar-code data is converted into character data that is an array of numerals and alphabets.

Moreover, amplitude information of the positive waveform is acquired using a timing signal that is generated corresponding to the positive waveform. Amplitude information of the negative waveform is acquired using a timing signal that is generated corresponding to the negative waveform. Corrected bar-code data generated by synthesizing the amplitude information of the positive waveform and the amplitude information of the negative waveform.

Further, amplitude information of the positive waveform is acquired by generating a timing signal corresponding to the positive waveform. Amplitude information of the negative waveform is acquired using a timing signal in which the timing signal corresponding to the positive waveform is delayed by a predetermined amount. The corrected bar-code data is generated by synthesizing the amplitude information of the positive waveform and the amplitude information of the negative waveform.

Furthermore, a synthesized waveform is generated by synthesizing the positive waveform with the negative waveform that is delayed by a predetermined amount. Amplitude information acquired from the synthesized waveform using a predetermined timing signal is used as corrected bar-code data.

According to another aspect of the invention, in a method of reading a bar code, a differential waveform of an optical power of reflected light that is formed at a differentiating step is divided into a positive waveform and a negative waveform. Corrected bar-code data, in which correct width of bar code is computed from the positive waveform and the negative waveform, is created. The corrected bar-code data is converted into character data that is an array of numerals and alphabets.

Thus, the present invention provides a bar-code reader and a method of reading a bar code that enables an accurate reading of a bar code by correcting a thickening and a thinning of the bar code.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical bar-code reader comprising: an optical scanner that optically scans a bar code to obtain optical power of light reflected from white bars and black bars of the bar code; a differentiation unit that calculates a differential of the optical power to obtain a differential waveform; a dividing unit that divides the differential waveform into a positive waveform and a negative waveform; a bar-code correcting unit that calculates correct widths of black bars in the bar code from the positive waveform and the negative waveform to create corrected bar-code data; and a converter that converts the corrected bar-code data into character data that is an array of numerals and alphabets.

2. The bar-code reader according to claim 1, further comprising a basic-width calculating unit that calculates the basic width of the bar code from either the positive waveform or the negative waveform.

3. The bar-code reader according to claim 1, wherein the bar-code correcting unit further comprises: an acquisition unit that acquires amplitude information of the positive waveform using a timing signal corresponding to the positive waveform and amplitude information of the negative waveform using a timing signal corresponding to the negative waveform; and a synthesizing unit that synthesizes the amplitude information of the positive waveform and the amplitude information of the negative waveform to create the corrected bar-code data.

4. The bar-code reader according to claim 3, wherein, the synthesizing unit controls a phase during synthesis of the amplitude information of the positive waveform and the amplitude information of the negative waveform such that a total of absolute value of each amplitude included in a result of synthesis becomes maximum.

5. The bar-code reader according to claim 1, wherein the bar-code correcting unit further comprises: a waveform-generating unit that generates a synthesized waveform by synthesizing the positive waveform with the negative waveform that is delayed by a predetermined amount; and an acquisition unit that acquires amplitude information from the synthesized waveform using a predetermined timing signal and uses the amplitude information acquired as the corrected bar-code data.

6. The bar-code reader according to claim 5, wherein the waveform-generating unit calculates the amount of delay from a ratio of a width of the black bar or a width of the white bar and a basic width of the bar code.

7. The bar-code reader according to claim 5, wherein the waveform-generating unit calculates the amount of delay from a correlation between the positive waveform and the negative waveform.

8. The bar-code reader according to claim 7, wherein the waveform-generating unit calculates the correlation by performing a fast Fourier transformation of each of the positive waveform and the negative waveform.

9. The bar-code reader according to claim 1, wherein the bar-code correcting unit further comprises: an acquisition unit that acquires amplitude information of the positive waveform by generating a timing signal corresponding to the positive waveform, and amplitude information of the negative waveform using a timing signal in which the timing signal corresponding to the positive waveform is delayed by a predetermined amount; and a synthesizing unit that synthesizes the amplitude information of the positive waveform and the amplitude information of the negative waveform to create the corrected bar-code data.

10. The bar-code reader according to claim 9, wherein the acquisition unit calculates the amount of delay from a ratio of a width of the black bar or a width of the white bar and a basic width of the bar code.

11. The bar-code reader according to claim 9, wherein, the synthesizing unit controls a phase during synthesis of the amplitude information of the positive waveform and the amplitude information of the negative waveform such that a total of absolute value of each amplitude included in a result of synthesis becomes maximum.

12. The bar-code reader according to claim 9, wherein the acquisition unit calculates the amount of delay from a correlation between the positive waveform and the negative waveform.

13. The bar-code reader according to claim 12, wherein the acquisition unit calculates the correlation by performing a fast Fourier transformation of each of the positive waveform and the negative waveform.

14. A method of reading a bar code comprising the steps of:
    optically scanning a bar code to obtain optical power of light reflected from white bars and black bars of the bar code;
    calculating a differential of the optical power to obtain a differential waveform;
    dividing the differential waveform into a positive waveform and a negative waveform;
    calculating correct widths of black bars in the bar code from the positive waveform and the negative waveform;
    creating corrected bar-code data; and
    converting the corrected bar-code data into character data that is an array of numerals and alphabets.

15. The method according to claim 14, wherein the step of calculating correct widths of black bars further includes the steps of:
    acquiring amplitude information of the positive waveform using a timing signal corresponding to the positive waveform and amplitude information of the negative waveform using a timing signal corresponding to the negative waveform; and
    synthesizing the amplitude information of the positive waveform and the amplitude information of the negative waveform to create the corrected bar-code data.

16. The method according to claim 14, wherein the step of calculating correct widths of black bars further includes the steps of:
    acquiring amplitude information of the positive waveform by generating a timing signal corresponding to the positive waveform, amplitude information of the negative waveform using a timing signal in which the timing signal corresponding to the positive waveform is delayed by a predetermined amount; and
    synthesizing the amplitude information of the positive waveform and the amplitude information of the negative waveform to create the corrected bar-code data.

17. The method according to claim 16, wherein the step of calculating correct widths of black bars further includes the steps of:
    generating a synthesized waveform by synthesizing the positive waveform with the negative waveform that is delayed by a predetermined amount; and
    acquiring amplitude information using a predetermined timing signal from the synthesized waveform and using the amplitude information acquired as the corrected bar-code data.

18. A computer program that makes a computer execute the steps of:
    optically scanning a bar code to obtain optical power of light reflected from white and black bars of the bar code;
    calculating a differential of the optical power to obtain a differential waveform;
    dividing the differential waveform into a positive waveform and a negative waveform;
    calculating correct widths of black bars in the bar code from the positive waveform and the negative waveform and creating corrected bar-code data; and converting the corrected bar-code data into character data that is an array of numerals and alphabets.

* * * * *